US012331813B2

United States Patent
Guo et al.

(10) Patent No.: US 12,331,813 B2
(45) Date of Patent: Jun. 17, 2025

(54) MULTISTAGE ELECTRIC CYLINDERS

(71) Applicant: LIM-TEC (LANGFANG) TRANSMISSION EQUIPMENT CO., LTD., Hebei (CN)

(72) Inventors: Ji Guo, Langfang (CN); Ziming Meng, Langfang (CN)

(73) Assignee: LIM-TEC (LANGFANG) TRANSMISSION EQUIPMENT CO., LTD., Langfang (CN)

( * ) Notice: Subject to any disclaimer, the term of this patent is extended or adjusted under 35 U.S.C. 154(b) by 0 days.

(21) Appl. No.: 18/455,581

(22) Filed: Aug. 24, 2023

(65) Prior Publication Data
US 2024/0328488 A1    Oct. 3, 2024

Related U.S. Application Data

(63) Continuation of application No. 18/451,823, filed on Aug. 17, 2023.

(30) Foreign Application Priority Data

Mar. 28, 2023  (CN) .......................... 202310308909.2
Mar. 28, 2023  (CN) .......................... 202320629026.7
(Continued)

(51) Int. Cl.
*F16H 25/20*    (2006.01)
*H02K 7/06*    (2006.01)
*H02K 7/116*    (2006.01)

(52) U.S. Cl.
CPC ............. *F16H 25/20* (2013.01); *H02K 7/06* (2013.01); *H02K 7/116* (2013.01); *F16H 2025/204* (2013.01); *F16H 2025/2081* (2013.01)

(58) Field of Classification Search
CPC ................ F16H 25/20; F16H 25/2056; F16H 2025/204; F16H 2025/2081; H02K 7/06; H02K 7/116
See application file for complete search history.

(56) References Cited

U.S. PATENT DOCUMENTS

| | | | |
|---|---|---|---|
| 4,295,384 A | 10/1981 | Brandt et al. | |
| 5,118,082 A * | 6/1992 | Byun | B66F 3/44 254/102 |

(Continued)

FOREIGN PATENT DOCUMENTS

| | | |
|---|---|---|
| CN | 114427594 A | 5/2022 |
| DE | 19519948 A1 | 12/1996 |

OTHER PUBLICATIONS

"Popularization of Introductory Knowledge about Electriccylinders", Web page <https://zhuanlan.zhihu.com/p/351064463>, Feb. 17, 2021.
(Continued)

*Primary Examiner* — Joseph Brown
(74) *Attorney, Agent, or Firm* — PORUS IP LLC

(57) ABSTRACT

The present disclosure discloses a multistage electric cylinder. The multistage electric cylinder includes a cylinder barrel, a linear motion component. The linear motion component is axially movable in the cylinder barrel and includes a first screw rod; a second screw rod which is sleeved on the first screw rod; a screw rod nut which is installed on the second screw rod; an immovable tube which is coaxially fitted on an outer side of the first screw rod and an outer side of screw rod nut; a first protective tube which is coaxially fitted on an outer side of the immovable tube and moves along an axial direction of the immovable tube; and a second protective tube which is coaxially fitted on an outer side of the first protective tube and moves along an axial direction of the first protective tube.

15 Claims, 6 Drawing Sheets

(30) Foreign Application Priority Data

Mar. 29, 2023 (CN) .......................... 202310314726.1
Mar. 29, 2023 (CN) .......................... 202310314728.0
Mar. 29, 2023 (CN) .......................... 202320642784.2
Mar. 29, 2023 (CN) .......................... 202320642792.7

(56) References Cited

U.S. PATENT DOCUMENTS

| | | | |
|---|---|---|---|
| 5,123,629 A * | 6/1992 | Takeuchi ................. | B66F 3/16 |
| | | | 254/133 R |
| 2005/0160846 A1 | 7/2005 | Chiang | |
| 2013/0283947 A1 | 10/2013 | Yamada et al. | |
| 2014/0000394 A1 | 1/2014 | Anheier et al. | |
| 2014/0326089 A1 | 11/2014 | Wu | |
| 2015/0040702 A1 | 2/2015 | Bochen et al. | |
| 2015/0047443 A1 * | 2/2015 | Tseng ..................... | F16H 25/20 |
| | | | 74/89.23 |
| 2016/0047446 A1 * | 2/2016 | Hung ...................... | A47B 9/04 |
| | | | 74/89.35 |
| 2018/0119783 A1 * | 5/2018 | Horn ..................... | F16H 25/2056 |
| 2018/0140087 A1 * | 5/2018 | Wu ....................... | F16H 25/2056 |
| 2018/0172062 A1 * | 6/2018 | Hu ....................... | F16H 25/2056 |
| 2018/0202524 A1 * | 7/2018 | Wu ....................... | F16H 25/2056 |

OTHER PUBLICATIONS

"What are the Advantages and Disadvantages of Electric Cylinders", Web page <http://www.dgguangtu.com/h-nd-73.html>.

* cited by examiner

MULTISTAGE ELECTRIC CYLINDERS

CROSS REFERENCE TO RELATED APPLICATION

This application is a Continuation of U.S. patent application Ser. No. 18/451,823 filed on Aug. 17, 2023, which claims priority of Chinese Patent Application No. 202310314726.1, filed on Mar. 29, 2023, Chinese Patent Application No. 202320642792.7, filed on Mar. 29, 2023, Chinese Patent Application No. 202310314728.0, filed on Mar. 29, 2023, Chinese Patent Application No. 202320642784.2, filed on Mar. 29, 2023, Chinese Patent Application No. 202310308909.2, filed on Mar. 28, 2023, and Chinese Patent Application No. 202320629026.7, filed on Mar. 28, 2023, the entire contents of which are incorporated herein by reference.

TECHNICAL FIELD

The present disclosure relates to the technical field of electric cylinders, and in particular to a multistage electric cylinder.

BACKGROUND

Electric cylinders convert rotational motion of a motor into linear motion, specifically convert precise rotational speed control, precise revolution control, and precise torque control of the motor into precise speed control, precise position control, and precise thrust control. The electric cylinders are a revolutionary product that enables high-precision linear motion. In situations with limited installation space, dimensions of single-stage electric cylinders often fail to meet requirements for use.

Therefore, it is desired to provide a multistage electric cylinder that is conducive to drainage, and has better waterproofing effect.

SUMMARY

One or more embodiments of the present disclosure provide a multistage electric cylinder. The multistage electric cylinder includes: a cylinder barrel, and a linear motion component. The linear motion component is axially movable in the cylinder barrel and includes a first screw rod; a second screw rod which is sleeved on the first screw rod; a screw rod nut which is installed on the second screw rod; an immovable tube which is coaxially fitted on an outer side of the first screw rod and an outer side of screw rod nut; a first protective tube which is coaxially fitted on an outer side of the immovable tube and moves along an axial direction of the immovable tube; and a second protective tube which is coaxially fitted on an outer side of the first protective tube and moves along an axial direction of the first protective tube.

In some embodiments, the multistage electric cylinder includes a reducer, an input end of which is connected to an output end of a motor; and a reduction gearbox, an input end of which is connected to an output end of the reducer.

In some embodiments, the reduction gearbox includes a driving wheel and a driven wheel, the driving wheel is connected to an output end of the reducer, and the driven wheel is connected to the first screw rod.

In some embodiments, the multistage electric cylinder further includes a sensor system, which includes a radial force sensor, an impact load sensor, and temperature sensor.

BRIEF DESCRIPTION OF THE DRAWINGS

The present disclosure will be further illustrated by way of exemplary embodiments, which will be described in detail by way of the accompanying drawings. These embodiments are not limiting, and in these embodiments the same numbering indicates the same structure where.

DETAILED DESCRIPTION

Figure 1:
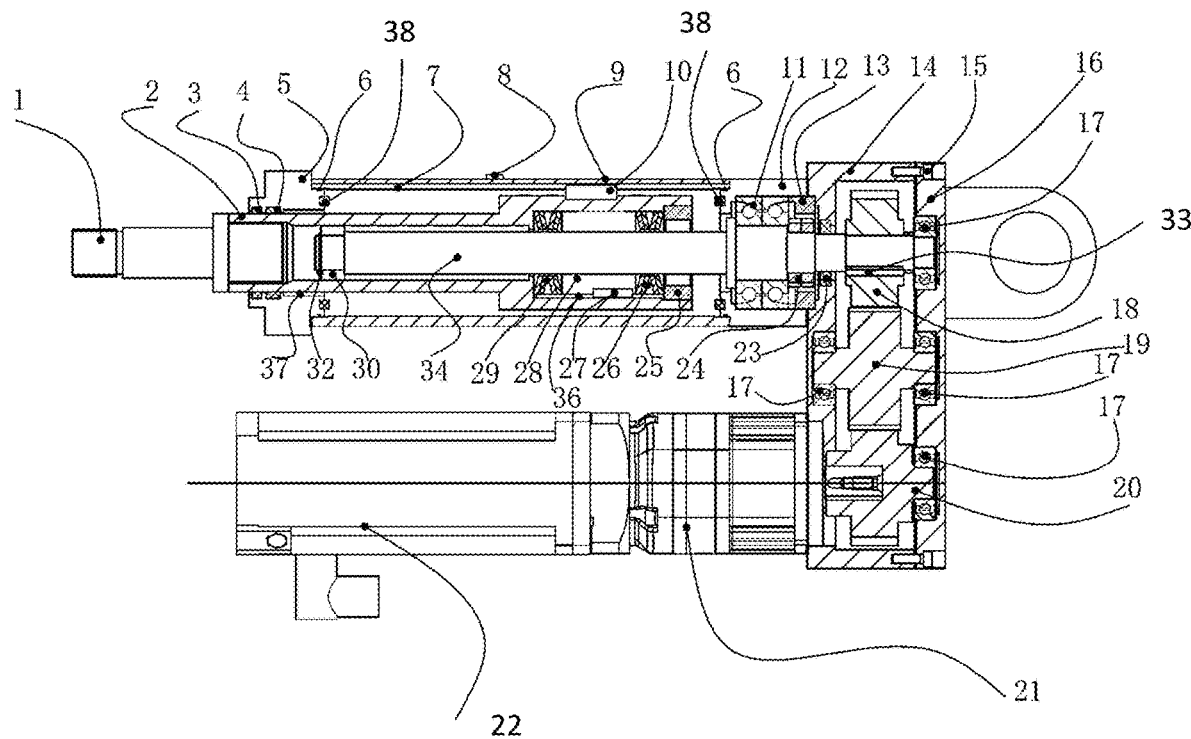
FIG. 1 is a schematic diagram of an exemplary structure of an electric cylinder according to some embodiments of the present disclosure.

In order to more clearly illustrate the technical solutions of the embodiments of the present disclosure, the following will be a brief description of the accompanying drawings that need to be used in the description of the embodiments. It will be apparent that the accompanying drawings in the following description are only examples or embodiments of the present disclosure, and that other similar scenarios may be applied to the present disclosure by those of ordinary skill in the art, without creative effort. Unless obviously obtained from the context or the context illustrates otherwise, the same numeral in the drawings refers to the same structure or operation.

As shown in the present disclosure and the claims, unless the context clearly suggests an exception, the words "one," "a," "an" and/or "the" do not refer specifically to the singular, but may also include the plural. In general, the terms "comprise" and "include" imply the inclusion only of clearly identified steps and elements that do not constitute an exclusive listing. A method or device may also include other steps or elements.

In some embodiments, an electric cylinder may include a cylinder barrel, a linear motion component, and a buffering device. The linear motion component is axially movable in the cylinder barrel, a load end of the linear motion component is connected to a load, and a power end of the linear motion component is connected to a power source. In some embodiments, the buffering device may be provided in the linear motion component. In some embodiments, the buffering device may be provided close to the load end of the linear motion component to achieve buffering of the load end. In some embodiments, the buffering device may be provided close to the power end of the linear motion component to achieve buffering of the power end.

The cylinder barrel is configured to carry internal parts of the electric cylinder. The cylinder barrel may be in various forms. For example, the cylinder may be made of cast iron, stainless steel, and other materials. Another example is that a shape of the cylinder barrel may be cylindrical. The material and shape of the cylinder barrel are not limited here.

The cylinder barrel prevents external impurities from entering an inside of the electric cylinder and prevents an operator from touching the linear motion components in motion, avoiding accidental injury to the operator from the electric cylinder.

The linear motion component is configured to perform linear motion. In some embodiments, the linear motion component may convert rotational motion to linear motion.

A load refers to a device connected to the electric cylinder. Exemplary loads may include an excavator bucket connected to the electric cylinder, or a bulldozer blade connected to the electric cylinder.

A power source is a structure that converts other energy sources into mechanical energy and produces kinetic energy. In some embodiments, the power source may include an electric motor, a hydraulic press, a pneumatic press, etc. In some embodiments, an output shaft of the power source may be connected to a transmission device (e.g., a gearbox, etc.) through which rotational power is transmitted to the linear motion component, and the rotational motion may be converted to the linear motion through the linear motion component.

The buffering device is configured to buffer the electric cylinder and reduce an impact of external impact load on the electric cylinder. The buffering device may include a spring set, etc. In some embodiments, the buffering device may be provided close to a load end of the linear motion component to provide buffering to the load end. In some embodiments, the buffering device may be provided close to a power end of the linear motion component to provide buffering to the power end.

In some embodiments, when the electric cylinder receives a pull or pushing force, a load is buffered by the buffering device, which may reduce a magnitude of the impact load on screws, nuts, etc., and improve a service life of the electric cylinder.

In some embodiments, the linear motion component may convert the rotational motion into the linear motion, thereby causing the load to which it is connected to perform the linear motion. In some embodiments, the linear motion component may include a push rod and a screw rod, the push rod being axially movable within the cylinder barrel and the screw rod being set within the push rod. The conversion of the rotational motion of the power source to the linear motion may be achieved by means of the screw rod and the push rod. More about the motion conversion may be found in descriptions below. In some embodiments, the push rod may be a hollow rod and the push rod may be made of metal. For example, the actuator may be a hollow steel rod. In some embodiments, the screw rod may be in a variety of forms. For example, the screw rod may be a trapezoidal screw, a ball screw rod, a planetary roller screw rod, or a rectangular threaded screw rod, etc.

FIG. 1 is a schematic diagram of an exemplary structure of an electric cylinder according to some embodiments of the present disclosure. Some of the following embodiments may be understood with reference to FIG. 1, but the accompanying drawing(s) is illustrative of only some of these embodiments and do not constitute a limitation on the embodiments.

In some embodiments, one end of a push rod 2 close to a power source may be provided with a holding cavity. As shown in FIG. 1, the holding cavity is provided at one end of the push rod 2 close to a reduction gearbox. In some embodiments, a screw rod 34 passes coaxially through the holding cavity. In some embodiments, the buffering device may include a first buffering component, which may be fitted on the screw rod 34 and located in the holding cavity. Two ends of the first buffering component along an axial direction of the first buffering component abut against side walls of the holding cavity.

In some embodiments, as shown in FIG. 1, the first buffering component may include a nut 28 and a first buffering spring set 29. The nut 28 is provided in the holding cavity and matches threads of the screw rod 34. In some embodiments, the nut 28 is axially movable on the screw rod 34 for converting rotational motion of the screw rod 34 into linear motion of the nut 28, which is axially movable in the holding cavity of the push rod 2. The nut 28 may be a trapezoidal nut, a ball nut, a planetary roller nut, a rectangular threaded nut, etc.

In some embodiments, two ends of the first buffering spring set 29 along an axial direction abut against side walls of the nut 28 and the holding cavity, respectively. In some embodiments, the first buffering spring set 29 may be a single spring fitted on the screw rod 34, or a spring set consisting of a plurality of springs provided along a circumference of the screw rod 34.

In some embodiments, at the end of the push rod 2 closed to the power source may be a compression nut 25, which is configured to form the holding cavity. For example, as shown in FIG. 1, the compression nut 25 may be threaded onto a right end of the push rod 2 to form the holding cavity.

In some embodiments, the first buffering component includes a second buffering spring set 26, which may be provided between the nut 28 and the compression nut 25. In some embodiments, the second buffering spring set 26 may be a single spring fitted on the screw rod 34, or a spring set consisting of a plurality of springs provided along the circumference of the screw rod 34.

For example, as shown in FIG. 1, when the electric cylinder is subject to a pulling force, the push rod 2 has a tendency to move to the left, which may drive the compression nut 25 to compress the second buffering spring set 26. After a load is buffered by the second buffering spring set 26, the load is transferred to the nut 28, which further transfers the load to the screw rod 34. Then the load may be transferred to a gearbox 14 and a gearbox cover 16 through a main bearing 11, and finally discharged through a lower support lug 35.

For example, as shown in FIG. 1, when the electric cylinder is subject to a pushing force, the push rod 2 has a tendency to move to the right, so that an end face of the push rod 2 may compress the first buffering spring set 29. After the load is buffered by the first buffering spring set 29, the load may be transferred to the nut 28, which further transfers the load to the screw rod 34. Then the load may be transferred to the gearbox 14 and the gearbox cover 16 through the main bearing 11, and finally discharged through the lower support lug 35.

In some embodiments, by providing the buffering spring set on both sides of the nut, the electric cylinder is buffered in time when it encounters severe working conditions during engineering operation(s), which greatly reduces the impact of external impact load on the electric cylinder and greatly extends the service life of the electric cylinder.

Figure 2:
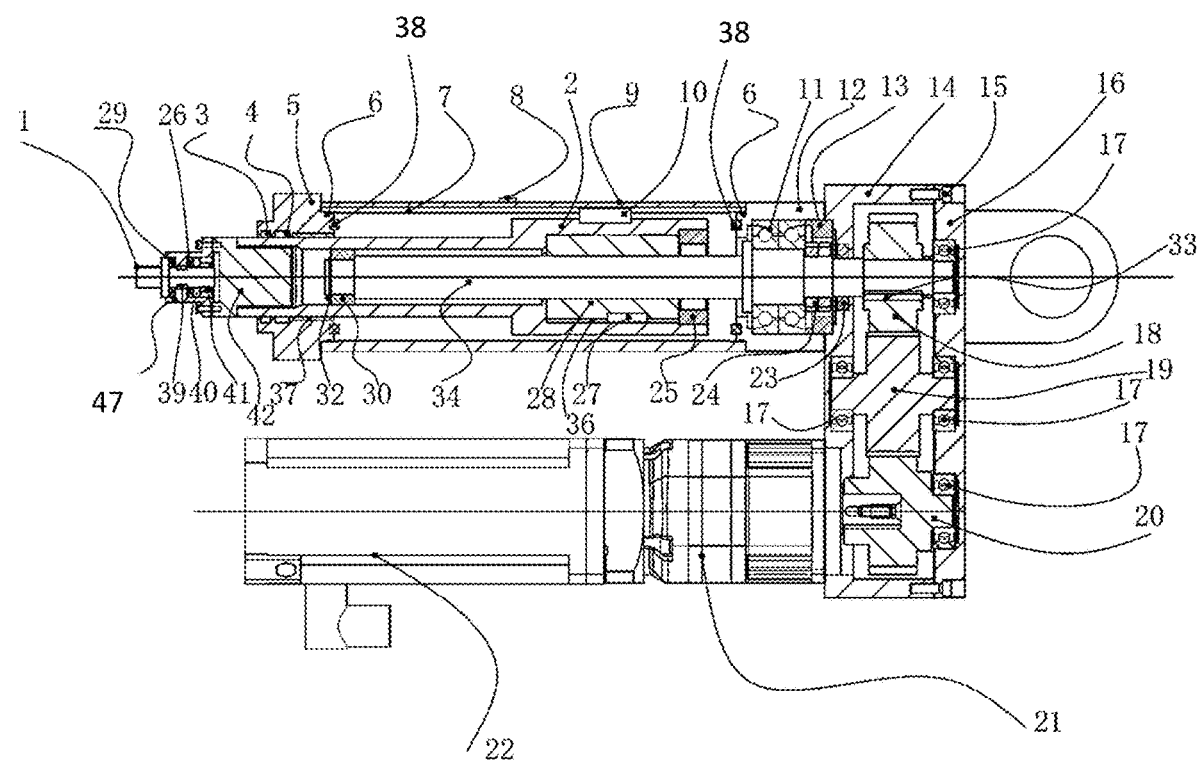
FIG. 2 is another schematic diagram of the exemplary structure of the electric cylinder according to some embodiments of the present disclosure.
Figure 3:
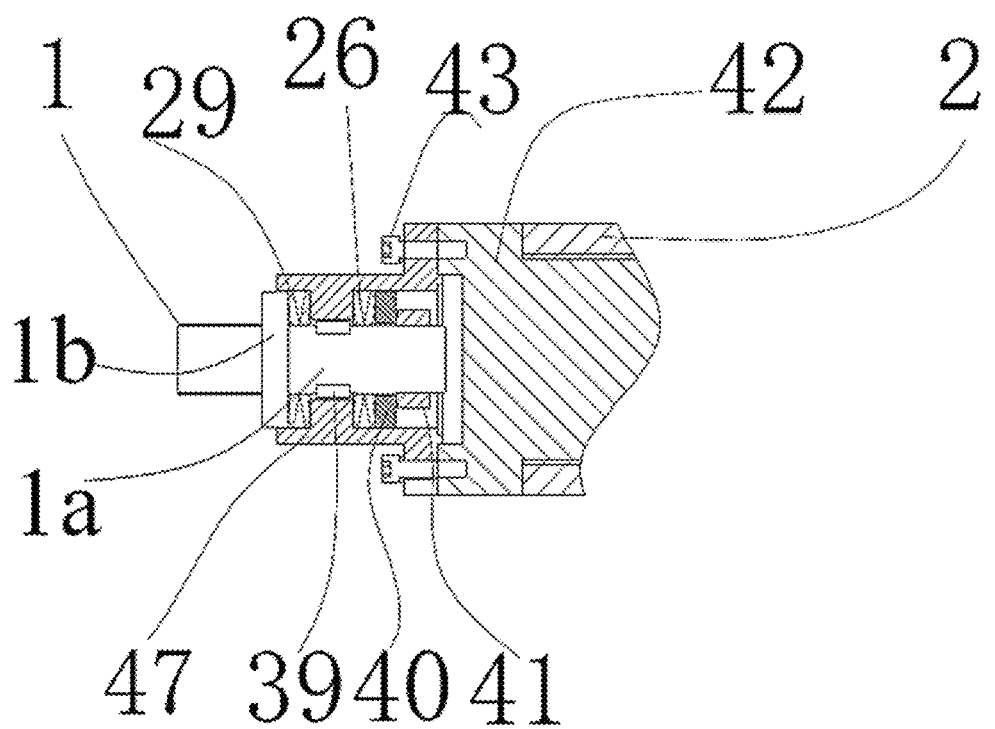
FIG. 3 is an enlarged schematic view of an exemplary front-end of the electric cylinder according to some embodiments of the present disclosure.

FIG. 2 is another schematic diagram of the exemplary structure of the electric cylinder according to some embodiments of the present disclosure. FIG. 3 is an enlarged schematic view of an exemplary front-end of the electric cylinder according to some embodiments of the present disclosure. Some of the following embodiments may be understood with reference to FIGS. 2 and 3, but the accompanying drawings are only illustrative of some of these embodiments and do not constitute a limitation on the embodiments.

In some embodiments, as shown in FIG. 2, one end of the push rod 2 closed to a load may be provided with a front-end joint 1. The front-end joint 1 is configured to connect to the load. The front-end joint 1 may be in various forms. For example, the front-end joint 1 may be an external threaded joint, a pin end, a rod end joint bearing, etc. In some embodiments, the front-end joint 1 may be provided with a mounting component and a buffering device may include a second buffering component. The second buffering component is fitted on the front-end joint 1 and located in the mounting component. In some embodiments, two ends of the second buffering component along the axial direction abut against the mounting component.

In some embodiments, as shown in FIGS. 2 and 3, the electric cylinder also includes a flange 42, one end of flange 42 is fixedly provided at one end of the push rod 2 (left end in FIG. 2), sealing an opening at the end of the push rod 2. In some embodiments, the front-end joint 1 includes a main body 1a, and the second buffering component is fitted on the main body 1a.

In some embodiments, the mounting component includes a spring seat 47, a limit plate 1b, and a spring pressure block 40. The second buffering component includes a third buffering spring set 45 and a fourth buffering spring set 46. In some embodiments, the third buffering spring set 45 and the fourth buffering spring set 46 may be a single spring fitted on the front-end joint 1 or may be a spring set consisting of a plurality of springs provided circumferentially along the front-end joint 1.

In some embodiments, one end of the main body 1a is rod-shaped and located within the spring seat 47 and is spaced from the flange 42, and the other end of the body portion 1a extends outside the spring seat 47 to connect to the load.

In some embodiments, the spring seat 47 has a hollow structure and one end of the spring seat 47 is connected to the flange 42 by a screw 43. The flange 42 is connected to the push rod 2 and the spring seat 47 respectively to transfer the load.

In some embodiments, an inner wall of the spring seat 47 has an annular protrusion, the protrusion is provided in the middle section of the spring seat 47, and spaced apart from the limit plate 1b and the flange 42, respectively.

In some embodiments, the limit plate 1b is fixedly connected to the main body 1a and seals the other end of the spring seat 47.

In some embodiments, the spring pressure block 40 is fixedly fitted on the main body 1a and located between the protrusion and the flange 42, with the spring pressure block 40 being spaced apart from the protrusion.

In some embodiments, the third buffering spring set 45 is fitted on the main body 1a and two ends of the third buffering spring set 45 along the axial direction abut against the spring pressure block 40 and the protrusion respectively. The fourth buffering spring set 46 is fitted on the main body, and two ends of the fourth buffering spring set 46 along an axial direction abut against the limit plate 1b and the protrusion respectively.

In some embodiments, a guiding key 39 is fixedly provided on the main body 1a as shown in FIGS. 2 and 3. A keyway is provided along an axial direction in the protrusion of the spring seat 47. The guiding key 39 is provided in the keyway in a matching manner and is capable of moving along the axial direction of the keyway. The guiding key 39 may prevent rotation of the front-end joint 1 when the front-end joint 1 is slightly displaced.

In some embodiments, the electric cylinder further includes a spring locking nut 41. The spring locking nut 41 is mounted on the main body 1a and is located between the flange 42 and the spring pressure block 40. In some embodiments, one end of the main body 1a may have external threads, and the spring locking nut 41 may be connected to the main body 1a by the external threads and axially fix the spring pressure block 40. In some embodiments, the spring locking nut 41 may provide a certain amount of preload to the third buffering spring set 45.

In some embodiments, as shown in FIGS. 2 and 3, one end of the flange 42 toward the spring seat 47 is provided with a cylindrical positioning groove along an axial direction. One end of the spring seat 47 is provided with a circular positioning tab, and the positioning tab is matched in the positioning groove to realize the mounting and positioning of the spring seat 47.

As an example, the third buffering spring set 45 is provided on a right side of the front-end joint 1 as shown in FIG. 2. When the electric cylinder is subject to a pulling force, the front-end joint 1 has a tendency to move to the left, which may drive the spring locking nut 41 to compress the spring pressure block 40, and then compress the third buffer spring set 45. After a load is buffered by the third buffer spring set 45, the load is transferred to the spring seat 47, which is connected to the flange 42. The load is then transferred to the flange 42, and further transferred to a gearbox and a gearbox cover through the push rod 2, the nut 28, the screw rod 34, and the main bearing 11, and finally unloaded (or discharged) through the lower support lug 35.

As an example, the fourth buffering spring set 46 is provided on a left side of the front-end joint 1 as shown in FIG. 2. When the electric cylinder is subject to a pushing force, the front-end joint 1 has a tendency to move to the right, so that an end face of the front-end joint 1 may compress the fourth buffer spring set 46, and after the fourth buffer spring set 46 buffers the load, the load is transferred to the spring seat 47. The spring seat 47 is connected to the flange 42 and the load is transferred to the flange 42, then the load is transferred to the gearbox and the gearbox cover through the push rod 2, the nut 28, the screw rod 34, and the main bearing 11, and finally unloaded through the lower support lug 35.

In some embodiments, by providing the front-end joint with the second buffering component, the electric cylinder is buffered in time when it encounters harsh working conditions during engineering operation(s), greatly extending the service life of the electric cylinder.

In some embodiments, as shown in FIGS. 1 and 2, a power source may include a motor 22, which is configured to provide power. In some embodiments, an output end of the motor 22 may be directly connected to a linear motion component to drive the linear motion component to move. In some embodiments, the motor 22 may be configured to drive the screw rod 34 to rotate. The motor 22 may be a three-phase AC motor, a servo motor, a DC motor, etc.

In some embodiments, the electric cylinder also includes a reducer 21 and a reduction gearbox. The reducer 21 may reduce speed of the motor 22 while increasing output torque to meet needs of various work scenarios. An input end of the reducer 21 may be connected to the output end of the motor 22, and an input end of the reduction gearbox may be connected to an output end of the reducer 21. An output end of the reduction gearbox transmits power to the linear motion component to drive the linear motion component to move. In some embodiments, the reducer 21 may be a planetary reducer.

In some embodiments, as shown in FIGS. 1 and 2, the reduction gearbox may include a driving wheel 20, an idler wheel 19, and a driven wheel 18, with the driving wheel 20, the idler wheel 19, and the driven wheel 18 all being rotatably provided in the gearbox. In some embodiments, the driving wheel 20, the idler wheel 19, and the driven wheel 18 are all gear structures with good stiffness. In some embodiments, the driving wheel 20 and the idler wheel 19 are rotatably provided in a gearbox 14 by means of an auxiliary bearing 17, which serves a purpose of positioning and supporting. The idler wheel 19 is provided between the driving wheel 20 and the driven wheel 18 and engages with both the driving wheel 20 and the driven wheel 18. In some embodiments, the driving wheel 20 is fixed at the output end of the reducer 21, the idler wheel 19 engages with the driving wheel 20, the driven wheel 18 engages with the idler wheel 19, and the driven wheel 18 is fixedly connected to the screw rod 34. The driven wheel 18 transmits power to the screw rod 34 through a flat key 33 to drive the screw rod 34 to rotate, and the nut 28 converts rotational motion of the screw rod 34 into linear motion, which then drives the push rod 2 for the linear motion.

In some embodiments, the reduction gearbox also includes the gearbox 14 and a gearbox cover 16, the gearbox 14 has a concave shape structure, and the gearbox cover 16 is fixed to one side of the gearbox 14 by a removable screw 15. The gearbox cover 16 is configured to seal the gearbox 14. In some embodiments, the reducer 21 is fixed to a bottom of the gearbox 14 and the driving wheel 20 is connected to an output shaft of the reducer 21 via the flat key for transmitting motion and power of the reducer 21 to the electric cylinder.

In some embodiments, as shown in FIGS. 1 and 2, the electric cylinder also includes a bearing chamber 12, a main bearing 11, a main bearing collar 13, and a bearing nut 24.

In some embodiments, the bearing chamber 12 is a cylindrical structure with open ends, and one end of the bearing chamber 12 is fixed to a side of the gearbox 14 for supporting the main bearing 11. In some embodiments, the main bearing 11 is provided in the bearing chamber to withstand the pulling force or the pushing force of the external load. In some embodiments, one end of the main bearing collar 13 engages with a side of the gearbox 14 and the other end engages with an outer ring of a side of the main bearing 11 for positioning the outer ring of the main bearing 11. In some embodiments, the bearing nut 24 is provided coaxially inside the main bearing collar 13. The bearing nut 24 is removably fixed on the screw rod 34, and the bearing nut 24 engages with an inner ring of the side of the main bearing 11 for fixing the inner ring of the main bearing 11.

In some embodiments, as shown in FIGS. 1 and 2, a central part of the screw rod 34 is provided with a flange structure, which engages with an other side of the main bearing 11. The screw rod 34 rotatably passes through the main bearing 11 and the bearing nut 24 and then rotatably positioned in the gearbox 14 through the auxiliary bearing 17 after being connected to the driven wheel 18 by the flat key 33. The bearing nut 24 is threaded onto the screw rod 34.

In some embodiments, as shown in FIGS. 1 and 2, a housing of the reducer 21 is fixedly connected to the gearbox 14, the bearing chamber 12 is fixedly connected to the gearbox 14, the main bearing 11 is mounted in the bearing chamber 12, and the screw rod 34 is rotatably supported in the main bearing 11. The main bearing 11 is subjected to the pulling force or the pushing force of the external load, and the bearing chamber 12 supports the main bearing 11. The main bearing collar 13 positions the outer ring of the main bearing 12.

In some embodiments, as shown in FIG. 1, a left end cover of the gearbox 14 is provided with an oil seal 23, and one end of the screw rod 34 (right end as shown in FIG. 1) extends through the oil seal 23 into the gearbox 14 to connect to the driven wheel 18. The bearing nut 24 holds the inner ring of the main bearing 11, which is threaded onto a first screw rod 75. In some embodiments, the screw rod 34 is separated from the gearbox 14 by the oil seal 23, allowing separate lubrication of internal grease of the cylinder and internal grease of the gearbox 14.

In some embodiments, as shown in FIGS. 1 and 2, the electric cylinder also includes a front-end cover 5, a push rod guide bearing 37, a dust seal 3, and a watertight seal 4. In some embodiments, the front-end cover 5 is fixed to one end of the cylinder barrel, the push rod guide bearing 37 is fixed in the front-end cover 5, and fitted on an outer side of the push rod 2. The dust seal 3 is fixed in the front-end cover 5 and fitted on the outer side of the push rod 2. The watertight seal 4 is fixed in the front-end cover 5 and fitted on the outer side of the push rod 2. In some embodiments, the push rod guide bearing 37 is made of a self-lubricating material.

In some embodiments, one end of a cylinder barrel 9 is screwed to the front-end cover 5 for mounting the dust seal 3, the watertight seal 4 and the push rod guide bearing 37, and an O-ring 6 is provided between the cylinder barrel 9 and the front-end cover 5 for sealing the entire electric cylinder and improving a protection level of the electric cylinder. An other end of the cylinder barrel 9 is fixed to one end of the bearing chamber 12.

In some embodiments, the dust seal 3, the watertight seal 4, and the push rod guide bearing 37 are spaced and provided between the push rod 2 and the front-end cover 5, extending from one end of the push rod to the other end. The dust seal 3 prevents external dust from entering an inside of the electric cylinder, ensuring a clean environment inside and avoiding rapid wear of the screw rod 34 and the nut 28 due to impurities, thus increasing the service life of the electric cylinder. The waterproof seal 4 prevents external moisture from entering the inside of the electric cylinder, preventing contamination of the internal grease by water. The push rod guide bearing 37 guides the push rod 2, allowing for smoother movement of the push rod 2. In some embodiments, the cylinder barrel 9 is provided with an oil nozzle 8 to facilitate maintenance and lubrication of the electric cylinder.

In some embodiments, a buffering pad 44 is respectively provided on a left end face of the bearing chamber 12 and on a right end face of the front-end cover 5, as shown in FIGS. 1 and 2. The buffering pad 44 may buffer an impact of the electric cylinder to a certain extent when the screw rod 34 of the electric cylinder exceeds its stroke during operation(s), preventing a damage to the electric cylinder caused by over-stroking.

In some embodiments, by providing the dust seal 3 and the watertight seal 4, the entire electric cylinder is sealed and the protection level of the electric cylinder is improved. The dust seal 3 prevents external dust from entering the inside of the electric cylinder, maintaining a clean environment inside and avoiding rapid wear of the screw rod and the nut due to impurities, thus increasing the service life of the electric cylinder. The watertight seal 4 prevents external moisture from entering the inside of the electric cylinder, preventing water contamination of the internal grease and enhancing the lubrication reliability of the electric cylinder, thereby making the electric cylinder have wide applications, e.g., it can be used outdoors and indoors.

In some embodiments, the electric cylinder may also include a plurality of electric cylinder mechanical limiting blocks 38. The plurality of electric cylinder mechanical limiting blocks 38 may be provided on an opposite side of the front-end cover 5 and the bearing chamber 12 respectively for blocking and limiting the holding cavity of the push rod. A material of the electric cylinder mechanical limiting blocks 38 may be rubber, polyurethane rubber, etc.

For example, as shown in FIGS. 1 and 2, two electric cylinder mechanical limiting blocks 38 may be provided on the opposite side of the front-end cover 5 and the bearing chamber 12, respectively.

In some embodiments, the electric cylinder mechanical limiting blocks 38 block the electric cylinder when the electric cylinder exceeds its stroke during the operation, reducing the impact on the electric cylinder caused by over-stroking.

In some embodiments, the electric cylinder also includes a first guiding groove 7, a stop-rotation key 10, a recess 36, and an inner stop-rotation key 27. The first guiding groove 7 is provided in the cylinder barrel 9 along an axial direction of the cylinder barrel 9. The stop-rotation key 10 is fixed to the outer end of the push rod and axially movably engaging with the first guiding groove 7, so that the stop-rotation key 10 may move along the first guiding groove 7. The stop-rotation key 10 restricts the rotational movement of the push rod 2, allowing only the linear motion. The recess 36 is axially provided on an inner side of the holding cavity. The inner stop-rotation key 27 is fixed on the nut 28, and axially movably engages with the recess 36, preventing the nut 28 from rotating.

In some embodiments, as shown in FIGS. 1 and 2, a screw rod guide bearing 30 is mounted inside the push rod 2 for supporting the screw rod 34 close to the load end. A snap ring 32 is provided for axial fixation of the screw rod guide bearing 30.

Figure 4:
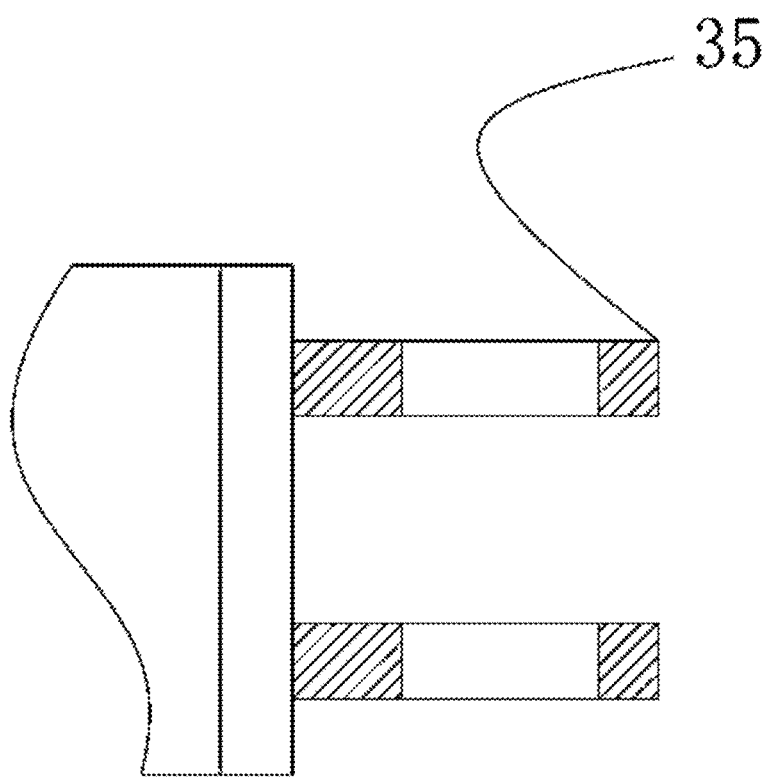
FIG. 4 is a schematic diagram of an exemplary structure of a lower support lug according to some embodiments of the present disclosure.

FIG. 4 is a schematic diagram of an exemplary structure of a lower support lug according to some embodiments of the present disclosure. Some of the following embodiments may be understood with reference to FIG. 4, but the accompanying drawing is illustrative of only some of these embodiments and does not constitute a limitation on the embodiments.

In some embodiments, as shown in FIG. 4, the electric cylinder also includes the lower support lug 35. The lower support lug 35 is connected to an electric cylinder at an end away from the front-end joint 1, i.e., the lower support lug 35 is provided on an outer side of the gearbox cover 16 and may be integrally molded with the gearbox cover 16. In some embodiments, the lower support lug 35 may be configured to connect to external machinery.

In some embodiments, as shown in FIGS. 1 and 2, the electric cylinder works as follows:

The motor 22 is energized, an output shaft of the motor 22 rotates and transmits the motion to the reducer 21 through a clamping hoop or a flat key, an output shaft of the reducer 21 starts to rotate, and then drives the driving wheel 20 to rotate through the flat key on the output shaft. The driving wheel 20 transmits the motion to the driven wheel 18 through the idler wheel 19. The driven wheel 18, in turn, transmits the motion to the screw rod 34 through the key 33. The screw rod 34 rotates, and the nut 28 converts the rotational motion of the screw rod 34 into linear motion, which then drives the push rod 2 in a linear motion.

Figure 5:
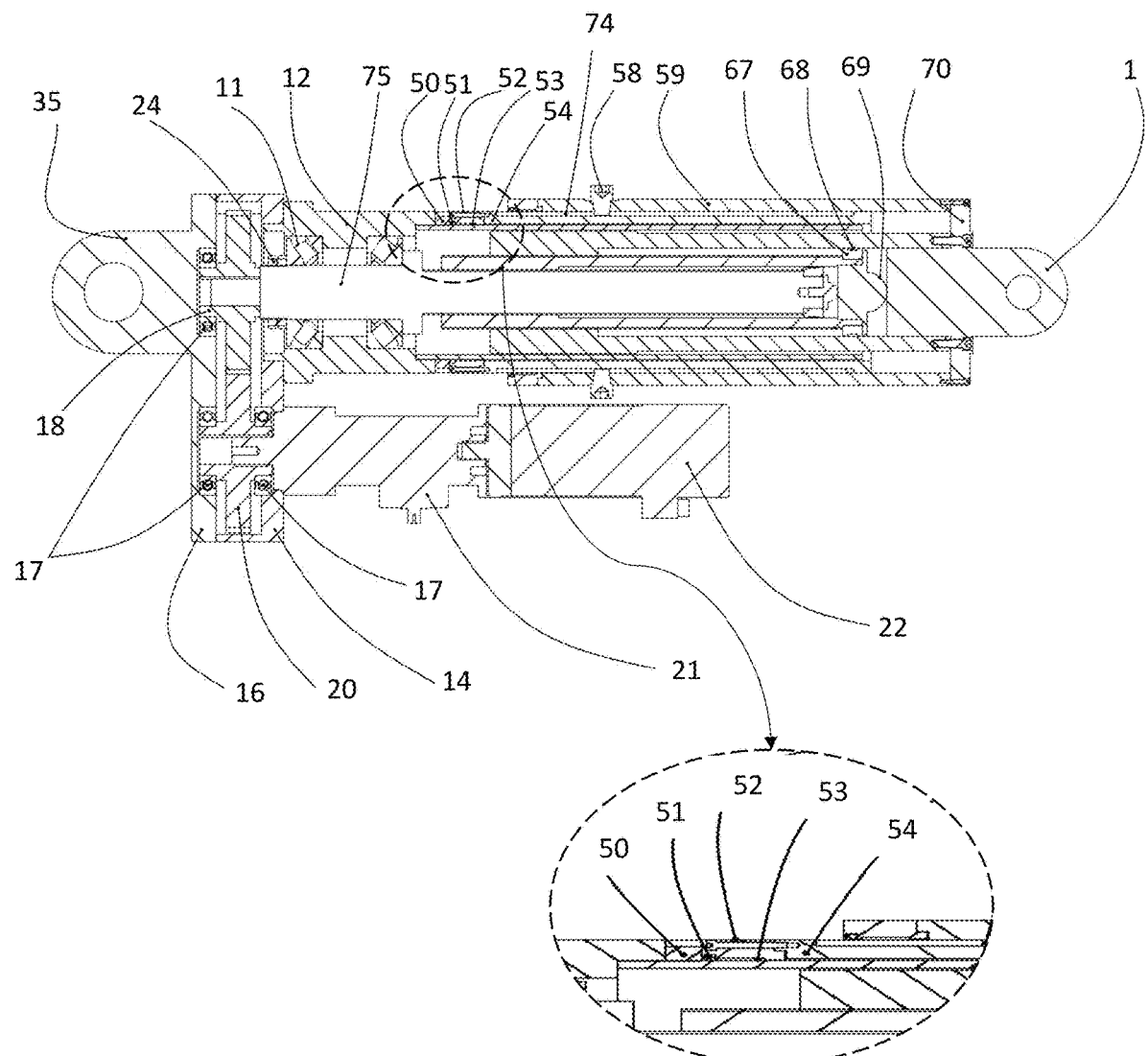
FIG. 5 is a schematic diagram of another exemplary structure of the electric cylinder according to some embodiments of the present disclosure.
Figure 6:
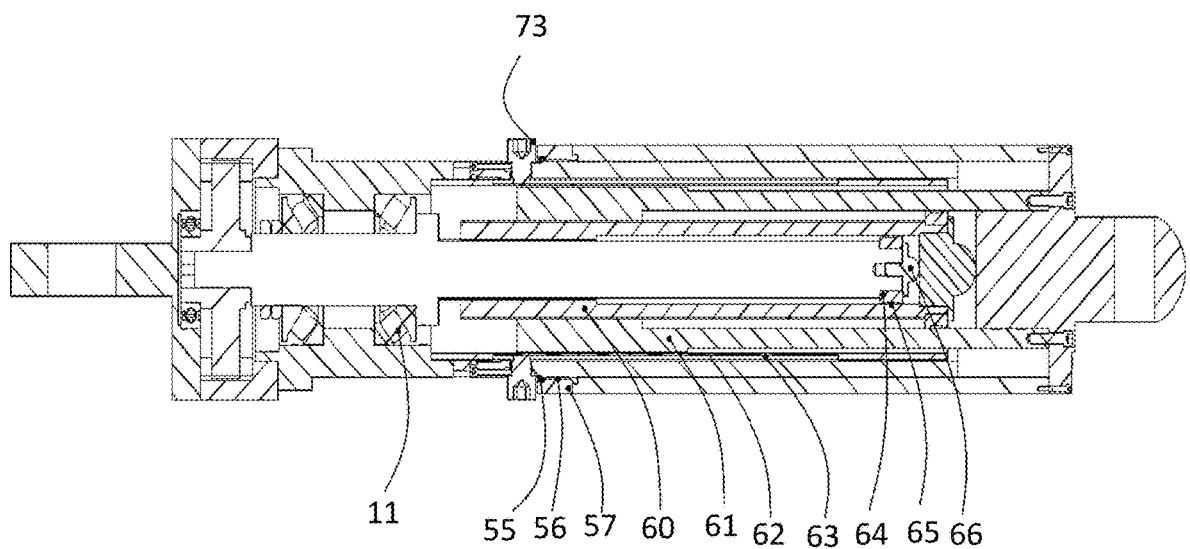
FIG. 6 is a schematic cross-sectional view of a linear motion component in a direction of a first guiding groove according to some embodiments of the present disclosure.

FIG. 5 is a schematic diagram of another exemplary structure of an electric cylinder according to some embodiments of the present disclosure. FIG. 6 is a schematic cross-sectional view of a linear motion component in a direction of a first guiding groove according to some embodiments of the present disclosure. Some of the following embodiments may be understood with reference to FIGS. 5 and 6, but the accompanying drawings are only illustrative of some of these embodiments and do not constitute a limitation on the embodiments.

In some embodiments, as shown in FIGS. 5 and 6, the linear motion component may include the first screw rod 75, a second screw rod 60, a screw rod nut 61, an immovable tube 62, a first protective tube 54, a second protective tube 59, and the front-end joint 1. In some embodiments, the second screw rod 60 has a hollow structure, and the second screw rod 60 may have internal threads. The second screw rod 60 is matched on the first screw rod through the internal threads. The second screw rod 60 may have external threads, and one end of the screw rod nut 61 may be matched on the second screw rod 60 through the internal threads.

In some embodiments, a first screw rod guide support seat 64 is fixedly mounted on the first screw rod 22 close to one end of the front-end joint 1. A first screw rod guide support bearing 65 is fitted on the first screw rod guide support seat 64, and an outer ring of the first screw rod guide support bearing 65 is supported on an inner wall of the second screw rod 60. A first screw rod guide support pressure block 66 is threaded onto one end of the first screw rod 75 (right end in FIG. 5) and is configured to press the first screw guide support seat 64 tightly. The first screw rod guide support bearing 65 is provided for supporting the first screw rod 75.

In some embodiments, one end of the second screw rod 60 (right end in FIG. 5) is mounted with a second screw rod guide support seat 67. A second screw rod guide support bearing 68 is fitted on the second screw rod guide support seat 67, and an outer ring of the second screw rod guide support bearing 68 is supported on an inner wall of the screw rod nut 61. A second screw rod guide support pressure block 69 is threaded onto one end of the second screw 60 (right end in FIG. 5) and is configured to press the second screw rod guide support seat 67 tightly. The second screw rod guide support bearing 68 is provided to support the second screw rod 60.

In some embodiments, the immovable tube 62 is coaxially and fixedly hollow-set on an outer side of the first screw rod 75 and the screw rod nut 61. One end of the immovable tube 62 is connected to the bearing chamber 12, and an outer wall of the immovable tube 62 is provided with a second guiding groove 63 along an axial direction. An immovable tube locking nut 50 locks the immovable tube 62 and adjusts an orientation of the immovable tube 62, i.e., adjusts an orientation of the second guiding groove 63.

In some embodiments, the first protective tube 54 is coaxially fitted on an outer side of the immovable tube 62 for protection of the electric cylinder. The first protective tube 54 may move axially along the immovable tube. The first protective tube 54 is threaded with a first anti-rotation pin 73, which may move along the second guiding groove 63 and serves to prevent rotation.

In some embodiments, the second protective tube 59 is coaxially fitted on an outer side of the first protective tube 54 for protection of the electric cylinder and may move axially along the first protective tube 54. An outer wall of the first protective tube 54 is axially provided with a third guiding groove 74. The second protective tube 59 is threaded with a second anti-rotation pin 58, which may move axially along the third guiding groove 74 to prevent rotation. In some embodiments, two ends of the second guiding groove 63 and the third guiding groove 74 respectively have a limiting portion for limiting a range of movement of the first protective tube 54 and the second protective tube 59.

In some embodiments, the front-end joint 1 is configured to connect the load and the front-end joint 1 is fixedly connected to both the other end (right end in FIG. 5) of the screw rod nut 61 and one end (right end in FIG. 5) of the second protective tube 59. When the second screw rod 60 and the screw rod nut 61 move axially to extend or retract the electric cylinder, the first protective tube 54 and the second protective tube 59 move axially to realize the protection of the electric cylinder.

In some embodiments, a front-end cover plate 70 is integrated on the front-end joint 1. The front-end cover plate 70 simultaneously seals end openings of the screw rod nut 61 and the second protective tube 59, and is fixedly connected to ends of the screw rod nut 61 and the second protective tube 59.

In some embodiments, a first front-end cover plate 52 is provided on one end (left end in FIG. 5) of the first protective tube 54 away from the front-end joint 1. The first front-end cover plate 52 is screwed to the first protective tube 54, and a first seal 51 and a first protective tube guide bearing 53 are mounted on an inner wall of the first front-end cover plate 52. The ingress of contaminants or water may cause rapid wear of the screw rod and the nut, which in turn may cause a multistage electric cylinder (also referred to as telescopic electric cylinder) to be scrapped. The first seal 51 prevents external dust and water from entering the multistage electric cylinder, maintain a clean environment inside the multistage electric cylinder at all times. The first protective tube guide bearing 53 is configured to guide the first protective tube 54.

In some embodiments, as shown in FIGS. 5 and 6, a second front-end cover plate 57 is screwed to one end of the second protective tube 59 near a power source, and a second seal 55 and a second protective tube guide bearing 56 are mounted on an inner wall of the second front-end cover plate 57. The ingress of contaminants or water may cause rapid wear of the screw and the nut, which in turn may cause the multistage electric cylinder to be scrapped. The second seal 55 prevents external dust and water from entering the multistage electric cylinder, maintaining a clean environment inside the multistage electric cylinder at all times. The second protective tube guide bearing 56 is configured to guide movement of the second protective tube.

In some embodiments, the electric cylinder may include a power device and a transmission device such as a motor and a reducer, and the power device and transmission device may be similar to the power device and the transmission device described in FIGS. 1 and 2, and will not be repeated.

In some embodiments, the power device and the transmission device of the electric cylinder may not be identical to those in FIGS. 1 and 2.

As an example, the input end of the reducer 21 is connected to the output shaft of the motor 22 as shown in FIG. 3. The driving wheel 20 is connected to the output shaft of the reducer 21 through the flat key. The reducer 21 transmits motion of the motor 22 to the driving wheel 20 after decelerating the motion of the motor 22. The driven wheel 18 engages with the driving wheel 20, and the driven wheel 18 is connected to one end of the first screw rod 75 through a flat key to transmit motion and power to the first screw rod 75. The gearbox 14 is provided outside the driving wheel 20 and the driven wheel 18 to accommodate the driving wheel 20 and the driven wheel 18. The housing of the gearbox 21 is fixedly mounted on one side of an end plate of the gearbox 14. The gearbox cover 16 is mounted on one end (left end in FIG. 5) of the gearbox 14 and is configured to seal the gearbox 14. Two auxiliary bearings 17 are mounted on an inner side of the gearbox cover 16, and an outer side is provided with the lower support lug 35. The lower support lug 35 is configured to fix the electric cylinder and unload a load to an external frame. The two auxiliary bearings 17 are provided one by one with the driving wheel 20 and the driven wheel 18 for positioning and supporting the driving wheel 20 and the driven wheel 18, respectively. The driving wheel 20 and the driven wheel 18 may both be of gear structures.

Exemplarily, one end of the bearing chamber 12 is fixedly connected to one end of the gearbox 14, and the main bearing 11 is mounted in the bearing chamber 12. The first screw rod 75 is rotatably supported in the main bearing 11, wherein the bearing chamber 12 is configured to support and protect the main bearing 11. The bearing nut 24 is mounted in the bearing chamber 12 to lock an inner ring of the main bearing 11. The main bearing 11 is subjected to a pushing force or a pulling force of an external load. The first screw rod 75 transfers the final load to the main bearing 11 and then unloads the load through the bearing chamber 12, the gearbox 14, the gearbox cover 16, and the lower support lug 35.

In some embodiments, as shown in FIGS. 5 and 6, the electric cylinder works as follows:

The motor 22 is energized, an output shaft of the motor 22 rotates and transmits the motion to the reducer 21 through a clamping hoop or a flat key, an output shaft of the reducer 21 starts to rotate, and then drives the driving wheel 20 to rotate. The driving wheel 20 transmits the motion to the driven wheel 18. The driven wheel 18 transmits the motion to the first screw rod 75 to drive the first screw rod 75 to rotate, and the second screw rod 60 is provided with internal threads inside the first screw rod 75 that engage with external threads of the first screw rod 75. At this point, the second screw rod 60 performs linear motion until an end of internal threads of the second screw rod 60 touches the first screw rod guide support seat 64, and the linear motion of the second screw rod 60 is limited, but the first screw rod 75 still performs rotational motion. At this time the second screw rod 60 performs the rotational motion together with the first screw rod 75, and the screw rod nut 61 performs the liner motion, driving the front-end joint 1, which is fixedly connected to the screw rod nut 61 to perform the liner motion.

The immovable tube 62 is fixed to the bearing chamber 12 through threads, so the immovable tube 62 is not rotatable. The second guiding groove 63 is provided on the immovable tube 62. The first anti-rotation pin 73 is threaded onto the first protective tube 54 and moves along the second guiding groove 63 provided on the immovable tube 62, so the first protective tube 54 is not rotatable either. Similarly, the second anti-rotation pin 58 is threaded and tightened on the second protective tube 59 and moves along the third guiding groove 74 on the first protective tube 54, providing an anti-rotation function.

A process of retraction of the electric cylinder is a reverse of the above process and will not be repeated here.

In some embodiments, by providing a plurality of protective tubes, diameters of the plurality of protective tubes increase one by one along a direction from a power input end to a load end of the electric cylinder, enabling the electric cylinder to have a better watertight effect, while having a smaller retracted size and a larger extended size.

In some embodiments, the electric cylinder further includes a sensor system. Sensors are configured to measure radial forces and impact loads. In some embodiments, the sensor system may include two or more sensors.

In some embodiments, the two or more sensors may include a radial force sensor for measuring the radial forces, and the radial force sensor may be provided circumferentially along the linear motion component. For example, the radial force sensor (not shown in the figure) may be provided inside the front-end joint 1, the push rod 2, and the cylinder barrel 9, as shown in FIGS. 1 and 2. The radial force sensor (not shown in the figure) may also be provided at the second protective tube 59, the second screw rod 60, and the screw rod nut 61, as shown in FIG. 5. The radial force sensor may be a pressure sensor, a piezoelectric sensor, etc.

In some embodiments, the two or more sensors may include an impact load sensor for measuring the impact load on the electric cylinder, and the impact load sensor should be located as close as possible to a location where the impact load sensor may be subjected to a large impact load. For example, the impact load sensor may be located at the front-end joint. For an electric cylinder with a buffering device, the impact load sensor may be provided on a side closer to the buffering device, between the buffering device and a power source, such that a measured impact load is a buffered impact load. The impact load sensor may be a combination of a force sensor and a displacement sensor to monitor forces and displacements of the screw rod, etc. due to vibration.

In some embodiments, the two or more sensors may also include a temperature sensor for measuring a temperature inside the electric cylinder. The temperature sensor may be deployed at the buffer device of the electric cylinder. During the operation of the electric cylinder, friction occurs, and high-frequency extension and retraction movements may cause the temperature of the electric cylinder to rise. When a temperature of the screw rod increases, a thermal effect of temperature rise may cause the screw rod to elongate, resulting in weak length stability and affecting transmission accuracy.

In some embodiments, the electric cylinder may further include a processor. The processor may communicate with the sensor system and the motor of the electric cylinder, etc.

In some embodiments, the processor may send a warning based on temperature sensor data in response to the temperature of the electric cylinder exceeding a threshold. In some embodiments, the processor may include an alarm device, the alarm device may send the warning, and the warning may be a musical or human voice for warning a user through sound. In some embodiments, the alarm device may also include a display, and the warning may be a warning message displayed on the display.

In some embodiments, the processor may analyze whether the radial force or the impact load exceeds a load based on data of the radial force sensor and the impact load sensor; and in response to the radial force or the impact load exceeding the load, a warning command is sent to the alarm device, thus controlling the alarm device to send the warning. Further, the processor may also respond to the radial force or the impact load severely exceeding the load by sending a regulation command to the motor, the regulation command includes regulation of a motor speed, thus reducing the motor speed, or controlling the motor to stop rotation.

In some embodiments, the processor may analyze whether the radial force or the impact load exceeds the load based on the data of the radial force sensor and the impact load sensor, through a preset algorithm, historical experience, etc. In some embodiments, the processor may analyze whether the radial force or the impact load exceeds the load through an overload determination model based on the data of the radial force sensor and the impact load sensor.

In some embodiments, the overload determination model is a machine learning model. In some embodiments, the overload determination model may be a Recurrent Neural Network (RNN) model, etc.

In some embodiments, an input of the overload determination model may include a sensor data sequence, usage data, and motor power data, and an output is a degree of overload for the radial force and the impact load. The sensor data sequence refers to a sequence of data collected by all sensors based on time points, including a radial force sensor data sequence, an impact load sensor data sequence, a temperature sensor data sequence, etc. The usage data refers to a duration and power consumption when the electric cylinder is in use. The motor power refers to power consumed when the power source (the motor) is operating. The degree of overload for the radial force and the impact load may indicate a degree of damage to the electric cylinder. For example, the higher the degree of overload, the greater the damage to the electric cylinder correspondingly.

In some embodiments, the overload determination model may be obtained by training based on a large number of first training samples with a first label. In some embodiments, the first training samples may at least include a sample sensor data sequence, sample usage data, and sample motor power data. The first label may include a degree of overload for radial force and impact load corresponding to the sample sensor data sequence, the sample usage data, and the sample motor power data. In some embodiments, the electric cylinder may be experimented with different forces and different force directions, and sensor data, electric cylinder power data, and motor power data collected during the experiment may be used as the first training sample. The degree of overload is determined according to the degree of damage to the electric cylinder after the experiment, which is used as the first label.

In some embodiments, the overload determination model may be trained based on the above samples in various ways to update model parameters. For example, the training may be processed based on a gradient descent. In some embodiments, the training is completed when a trained overload determination model satisfies a preset condition. The preset condition may be that a loss function result converges or is less than a preset threshold, etc.

In some embodiments, the electric cylinder may be continuously monitored in real-time for the load and impact it experiences using the radial force sensor data and impact load sensor data. The overload determination model may accurately estimate harm or damage caused by a current load and impact on the electric cylinder, enabling early and accurate judgment and effectively preventing irreversible damage to the electric cylinder. When the radial force or the impact load seriously exceeds the load, the processor controls a reduction in the motor speed or stops the motor, greatly protecting the electric cylinder and preventing damage caused by excessive loads in complex situations.

In some embodiments, the sensor system may also include a spring position detection sensor. The processor may monitor a length of a spring in the buffering device based on the spring position detection sensor. The spring position detection sensor may be provided at one end of the spring and may be a displacement sensor or a distance sensor that measures a distance between two ends of the spring.

In some embodiments, the processor may send a spring failure warning in response to the spring rebounding after a position greater than a threshold value; and in response to the spring failure warning, the spring is replaced.

In some embodiments, a position of the spring after it has rebounded may be determined in a following manner. When the electric cylinder is activated, the distance between the two ends of the spring is recorded as a natural extended position. During the operation of the electric cylinder, the length of the spring should not exceed a theoretical maximum length of the spring or be shorter than a theoretical minimum length of the spring. When the electric cylinder stops and the spring returns to its natural state, the length of the spring relative to the distance when the electric cylinder stops should be less than a threshold value (i.e., the spring should return to approximately its natural extended position). The threshold value may be preset empirically.

In some embodiments, the length of the spring is temperature dependent. The use of the electric cylinder may cause an increase in temperature, and the length of a same spring may vary at different temperatures. In some embodiments, the processor may calculate a relationship between temperature and spring length as a function of temperature. The processor converts lengths of the spring at different temperatures to a length of the spring at a same temperature as at start-up, and then compares the position of the spring after rebound to the threshold value.

In some embodiments, the length of the spring is also related to a force applied. When actual deformation of the spring does not match the force applied to the spring, it may also indicate a problem with the spring. For example, when subjected to a pulling force of 500N, the spring should only extend 0.5 cm, but if the spring extends 1 cm, then there is a problem with the spring.

In some embodiments, the radial force sensor may obtain a radial force on the electric cylinder, and the processor may be informed by the radial force sensor that the electric cylinder is subject to a pulling force or a pushing force. In response to the electric cylinder being subject to the pulling force or the pushing force, the processor may use the spring position detection sensor at preset intervals to measure length data of a first buffering spring set, a second buffering spring set, a third buffering spring set, a fourth buffering spring set, and generate (a) length change sequence(s) for the buffering spring set(s). Based on a plurality of length change sequences for the electric cylinder subjected to the pulling force or the pushing force, the processor may predict a degree of wear of the buffering spring set through a wear prediction model; and in response to the degree of wear greater than a threshold value, a command is sent to the alarm device, which causes the alarm device to send a spring failure warning.

In some embodiments, the wear prediction model is a machine learning model. In some embodiments, the wear prediction model may be a machine learning model of a custom structure as described below. The wear prediction model may also be machine learning model of other structures, such as a neural network model.

In some embodiments, an input of the wear prediction model may include a plurality of length change sequences and an output is a predicted degree of wear. The plurality of length change sequences refer to length change data of the spring(s) that occur continuously over time when the electric cylinder is subjected to the pulling force or the pushing force.

In some embodiments, the wear prediction model may be obtained by training a large number of second training samples with a second label. In some embodiments, the second training samples may at least include a sample length change sequence. The second label may be a degree of wear corresponding to the sample length change sequence. In some embodiments, the second training samples may be experimental data; and the second label may be obtained by manual labeling. For example, when conducting a pressure test and an aging test on the spring, the degree of wear may be artificially labeled based on test data and observed spring performance.

In some embodiments, the wear prediction model may be trained in various ways to update model parameters based on the samples described above. For example, the wear prediction model may be trained based on a gradient descent. In some embodiments, the training is completed when a trained wear prediction model satisfies a preset condition. The preset condition may be that a loss function result converges or is less than a preset threshold, etc.

In some embodiments, the processor may also analyze a current situation of force on the electric cylinder, a current power of the power source (the motor), and a time to complete each stage of stretch. The processor may also determine whether there is an abnormality in the electric cylinder based on an analysis result; and in response to presence of an abnormality in the electric cylinder, the processor determines a type of the abnormality. The situation of force may include a magnitude and a direction of the force on the front-end joint. The processor may also determine whether there is the abnormality in the electric cylinder and the type of the abnormality based on an analysis result based on a preset rule.

In some embodiments, the processor may fit a relationship curve of data of the situation of force, motor power, and completion time of extension or retraction based on a preset algorithm, and predict the completion time of extension or retraction through the relationship curve function. In some embodiments, the processor may also predict the completion time of extension or retraction of the electric cylinder based on a machine learning model.

In some embodiments, the processor may determine that the electric cylinder has an abnormality when an actual completion time of extension or retraction differs significantly from the predicted completion time of extension or retraction; and based on a size and a type of the difference, determine the type of the abnormality. Based on the type of the abnormality, the processor may send a warning command to the alarm device, so that the alarm device may send the warning, and the alarm device may also display the abnormality type to the user, so that the user may handle the abnormality type accordingly, such as stopping the operation and replacing parts.

For example, if the actual completion time of extension or retraction is much longer than the predicted completion time of extension or retraction, the type of the abnormality may be a failure of lubrication and friction, an aging and sliding of the screw rod, etc. If the actual completion time of extension or retraction is much shorter than the predicted completion time of extension or retraction, the type of the abnormality may be that the electric cylinder proceeds to a next step when the current first protective tube has not been fully extended; or the type of the abnormality may be that the screw rod is stuck. For example, if a time for complete extension of the first protective tube is shorter than a predicted time, it may be that the first screw rod and the second screw rod get stuck, and the second screw rod is driven to rotate together by the first screw rod when the second screw rod performs the linear motion.

In some embodiments, there is a mechanical correlation between multiple stages of expansion and retraction of the electric cylinder. If there is a malfunction in a first stage of expansion and retraction, it is likely that subsequent stages will also fail to complete the expansion and retraction successfully. Therefore, the processor may predict and determine if there is an abnormality in each stage of the electric cylinder's multiple stages of extension or retraction process. If an abnormality is detected in a certain stage, the processor may send a warning through the alarm device and display to the user which stage of the multiple stages of extension and retraction the abnormality occurred in, allowing the user to take appropriate actions such as repairing parts related to the stage.

In some embodiments, the processor may predict if there is an abnormality in each stage of the extension and retraction process through an abnormality prediction model. For example, when training the abnormality prediction model, a loss function may include a plurality of loss terms, and each loss term may correspond to one of the multiple stages of the extension and retraction process.

In some embodiments, the abnormality prediction model may be a machine learning model. In some embodiments, the abnormality prediction model may be a machine learning model with a custom structure described below. The abnormality prediction model may also be machine learning models of other structures, such as neural network models.

In some embodiments, an input of the abnormality prediction model may include a force sequence acting on the electric cylinder for each stage of extension and retraction, a moto power sequence for each stage of extension and retraction, a completion time for each stage of extension and retraction, and an output is whether there is an abnormality during each stage of extension and retraction.

In some embodiments, the abnormality prediction model may be obtained by training based on a large number of third training samples with a third label. In some embodiments, the third training sample may at least include a sample a force sequence acting on the electric cylinder for each stage of extension and retraction, a sample moto power sequence for each stage of extension and retraction, a sample completion time for each stage of extension and retraction. The third training sample may be obtained from historical data and experimental data. The third label may also be obtained by manual labeling.

In some embodiments, the abnormality prediction model may be trained based on the above samples in various ways to update model parameters. For example, the training may be processed based on a gradient descent. In some embodiments, the training is completed when a trained abnormality prediction model satisfies a preset condition. The preset condition may be that a loss function result converges or is less than a preset threshold, etc.

In some embodiments, the loss function is constructed such that the each stage of extension and retraction corresponds to a loss term (e.g., for a three-stage extension and retraction processes, the loss function includes three loss terms), and weights of the loss terms are related to a sequence of occurrence of the extension and retraction processes. For example, the earlier the extension and retraction process occurs, the greater the weight of the loss term corresponding to the extension and retraction process.

In some embodiments, by assigning different weights to each stage of extension and retraction process, accurate prediction of an abnormality in an earlier extension and retraction process may be achieved, followed by training subsequent extension and retraction processes sequentially. This approach leads to faster training convergence and improves the training efficiency of the abnormality prediction model.

In some embodiments, by monitoring the temperature of the electric cylinder, the position of the spring, and the wear of the buffering spring set, the ability to detect abnormalities during the use of the electric cylinder is significantly improved, thereby increasing the service life of the electric cylinder. Additionally, by monitoring the multistage extension and retraction of the electric cylinder, the extension and retraction time and the abnormality are determined more accurately, resulting in improved reliability of the electric cylinder.

The basic concepts have been described above, and it is clear that the above detailed disclosure is intended as an example only for those skilled in the art and does not constitute a limitation of the present disclosure. Although not explicitly stated herein, there are various modifications, improvements, and amendments that may be made to the present disclosure by those skilled in the art. Such modifications, improvements, and amendments are suggested in the present disclosure, so such modifications, improvements, and amendments remain within the spirit and scope of the exemplary embodiments of the present disclosure.

Also, the present disclosure uses specific words to describe embodiments of the present disclosure. For example, "one embodiment", "an embodiment", and/or "some embodiments" refer to a certain feature, structure, or characteristic related to at least one embodiment of the present disclosure. Therefore, it should be emphasized and noted that "one embodiment" or "an embodiment" or "an alternative embodiment" mentioned twice or more in different places in the present disclosure does not necessarily refer to the same embodiment. In addition, certain features, structures, or characteristics of one or more embodiments of the present disclosure may be suitably combined.

Furthermore, unless expressly stated in the claims, the order or elements and sequences of treatment, the use of alphanumeric numbers, or other names described in this description shall not be used to define the order of processes and methods in this description. Although some embodiments of the invention currently considered useful are discussed in the above disclosure by way of various examples, it should be understood that such details serve only illustrative purposes and that the additional claims are not limited to the disclosed embodiments; rather, the claims are intended to cover all amendments and equivalent combinations consistent with the substance and scope of the embodiments of the present disclosure.

Similarly, it should be noted that in order to simplify the presentation of the present disclosure and thereby aid in the understanding of one or more embodiments of the present disclosure, the preceding descriptions of embodiments of the present disclosure sometimes group multiple features into one embodiment, accompanying drawings, or description thereof. However, this manner of disclosure does not imply that more features are required by the subject matter of the present disclosure than those mentioned in the claims. Rather, claimed subject matter may lie in less than all features of a single foregoing disclosed embodiment.

Some embodiments use numbers with description ingredients and attributes. It should be understood that the number described by such examples is used in some examples with the modified words "about", "approximate" or "substantially" to modify. Unless otherwise stated, "about", "approximately" or "substantially" indicates that ±20% variation is allowed in the stated figures. Accordingly, in some embodiments, the numerical parameters used in the present disclosure and claims are approximations, which may change depending on the desired characteristics of individual embodiments. In some embodiments, the numerical parameters should consider the specified number of valid digits and use general digit retention. Notwithstanding that the numerical fields and parameters used in some embodiments of the present disclosure to confirm the breadth of their ranges are approximations, in specific embodiments, such numerical values are set as precisely as practicable.

For each patent, patent application, patent application publications, and other materials cited by the present disclosure, such as articles, books, instructions, publications, documents, etc., all of them will be incorporated in the present disclosure as a reference. History application documents that are inconsistent or conflictive with the contents of the present disclosure are excluded, as well as documents (currently or subsequently appended to the present disclosure) limiting the broadest scope of the claims of the present disclosure. It should be noted that, if there is any inconsistency or conflict between the descriptions, definitions, and/or usage of terms in subsidiary information of the present disclosure and the contents of the present disclosure, the descriptions, definitions, and/or usage of terms in the present disclosure shall prevail.

Finally, it should be understood that the embodiments described in the present disclosure are used only to illustrate the principles of the embodiments of the present disclosure. Other variations may also fall within the scope of the present disclosure. Thus, by way of example and not limitation, alternative configurations of embodiments of the present disclosure may be considered consistent with the teachings of the present disclosure. Accordingly, the embodiments of the present disclosure are not limited to the embodiments explicitly introduced and described in the present disclosure.

What is claimed is:

1. A multistage electric cylinder, comprising:
   a cylinder barrel;
   a motion component includes a first screw rod, a second screw rod, a screw rod nut, a first protective tube, a second protective tube, and a first screw rod guide support seat;
   an immovable tube;
   wherein:
      the first screw rod has external threads, the second screw rod has a hollow structure and internal threads, the second screw rod is matched on the first screw rod through the internal threads of the second screw rod so that the second screw rod is sleeved on the first screw rod;
      the screw rod nut is installed on the second screw rod;
      the immovable tube is coaxially and fixedly hollow-set on an outer side of the screw rod nut;
      the first protective tube is coaxially fitted on an outer side of the immovable tube and moves along an axial direction of the immovable tube;
      the second protective tube is coaxially fitted on an outer side of the first protective tube and moves along an axial direction of the first protective tube, wherein an outer wall of the first protective tube is axially provided with a third guiding groove; the second protective tube is fixedly provided with a second anti-rotation pin, which moves axially along the third guiding groove, and
      two ends of the second guiding groove and the third guiding groove respectively have limiting portions;
      the first screw rod guide support seat is fixedly mounted on the first screw rod; and
      when the first screw rod is driven to rotate, the first screw rod drives the second screw rod in a straight line motion along an axis of the cylinder barrel with cooperation with the external threads of the first screw rod and the internal threads of the second screw rod until an end of the internal threads of the second screw rod resists against the first screw rod guide support seat;
      after the end of the internal threads of the second screw rod resists against the first screw rod guide support seat, the second screw rod follows the first screw rod in rotation, and with the cooperation of the external threads of the second screw rod with internal threads of the screw crew rod nut, the second screw rod drives the screw rod nut in a straight line motion along the axis of the cylinder barrel.

2. The multistage electric cylinder according to claim 1, wherein the motion component further includes:
   a front-end joint which is fixedly connected to the screw rod nut and the second protective tube, respectively, and is also connected to a load.

3. The multistage electric cylinder according to claim 2, wherein a front-end cover plate is integrated on the front-end joint; the front-end cover plate simultaneously seals end openings of the screw rod nut and the second protective tube, and is fixedly connected to ends of the screw rod nut and the second protective tube.

4. The multistage electric cylinder according to claim 1, wherein an outer wall of the immovable tube is provided with a second guiding groove along the axial direction of the immovable tube, the first protective tube is fixedly provided with a first anti-rotation pin, which moves axially along the second guiding groove.

5. The multistage electric cylinder according to claim 1, further comprising: a first screw rod guide support bearing which is fitted on the first screw rod guide support seat, and an outer ring of the first screw rod guide support bearing is supported on an inner wall of the second screw rod.

6. The multistage electric cylinder according to claim 1, wherein one end of the second screw rod is connected to the first screw rod, and a second screw rod guide support seat is mounted on another end of the second screw rod.

7. The multistage electric cylinder according to claim 6, wherein a second screw rod guide support bearing is fitted on the second screw rod guide support seat, and an outer ring of the second screw rod guide support bearing is supported on an inner wall of the screw rod nut.

8. The multistage electric cylinder according to claim 1, wherein a first front-end cover plate is connected to the first protective tube, a first seal and a first protective tube guide bearing are mounted on an inner wall of the first front-end cover plate.

9. The multistage electric cylinder according to claim 1, wherein a second front-end cover plate is connected to the second protective tube, a second seal and a second protective tube guide bearing are mounted on an inner wall of the second front-end cover plate.

10. The multistage electric cylinder according to claim 1, further comprising:

a reducer, an input end of which is connected to an output end of a motor; and a reduction gearbox, an input end of which is connected to an output end of the reducer.

11. The multistage electric cylinder according to claim 10, wherein the reduction gearbox includes a driving wheel and a driven wheel, the driving wheel is connected to the output end of the reducer, and the driven wheel is connected to the first screw rod.

12. The multistage electric cylinder according to claim 11, wherein the driving wheel and the driven wheel are all gear structures, the driving wheel and the driven wheel are driven through gears meshing.

13. The multistage electric cylinder according to claim 1, further comprising:

a sensor system, which includes a radial force sensor, an impact load sensor, and a temperature sensor.

14. The multistage electric cylinder according to claim 13, further comprising:

a processor which communicates with the sensor system and a motor of the multistage electric cylinder, and is configured to:

analyze whether a radial force or an impact load exceeds a load based on data obtained by the radial force sensor and the impact load sensor; and in response to the radial force or the impact load exceeding the load, send a warning command to an alarm device, or send an adjustment command to the motor, the adjustment command including adjustment of a rotate speed of the motor.

15. The multistage electric cylinder according to claim 14, wherein the processor is further configured to:

analyze a current situation of force on the multistage electric cylinder, a current power of the motor, and a time to complete stretch of each stage of the multistage electric cylinder;

determine whether there is an abnormality in the multistage electric cylinder based on an analysis result;

in response to presence of the abnormality in the multistage electric cylinder, determine a type of the abnormality; and send the warning command to the alarm device.

* * * * *